United States Patent [19]

Stevenson

[11] 4,275,710
[45] Jun. 30, 1981

[54] SOLAR COLLECTOR

[76] Inventor: Sanford Stevenson, 3506 Bohn Rd., Mount Horeb, Wis. 53572

[21] Appl. No.: 94,886

[22] Filed: Nov. 16, 1979

[51] Int. Cl.³ .............................................. F24J 3/02
[52] U.S. Cl. .................................. 126/424; 126/432; 126/450
[58] Field of Search ............... 126/424, 425, 432, 450, 126/417, 429; 250/203 R

[56] References Cited

U.S. PATENT DOCUMENTS

| | | | |
|---|---|---|---|
| 2,205,378 | 6/1940 | Abbot | 126/424 |
| 4,066,062 | 1/1978 | Houston | 126/424 |
| 4,077,392 | 3/1978 | Garner | 126/424 |
| 4,098,264 | 7/1978 | Brokaw | 126/425 |
| 4,108,155 | 8/1978 | Koizumi et al. | 126/429 |
| 4,122,827 | 10/1978 | Rhodes | 126/424 |
| 4,129,119 | 12/1978 | Yoke | 126/424 |
| 4,155,347 | 5/1979 | Heller et al. | 126/424 |
| 4,185,615 | 1/1980 | Bottum | 126/424 |
| 4,205,659 | 6/1980 | Beam | 126/425 |
| 4,214,574 | 7/1980 | O'Hanlon | 126/450 |

FOREIGN PATENT DOCUMENTS

| | | | |
|---|---|---|---|
| 1278188 | 10/1961 | France | 126/424 |
| 486189 | 9/1975 | U.S.S.R. | 126/424 |

*Primary Examiner*—Daniel J. O'Connor
*Attorney, Agent, or Firm*—Isaksen, Lathrop, Esch, Hart & Clark

[57] ABSTRACT

A solar collector (10) is disclosed which is tiltable about a horizontal axis so as to vary the angle at which solar radiation is received by the collector (10). The solar collector (10), which uses air as the heat transfer medium, has connected to it a pair of fixed, well-insulated air transfer passages (12, 14) which penetrate through into the interior of the collector (10) at the lateral sides thereof aligned with the horizontal axis about which the collector (10) is pivoted. The air transfer passages (12, 14) are insulated and are gasketed to the sides of the collector (10) so as to improve the efficiency of the solar energy system by avoiding losses of heat from the heat transfer fluid during transfer of the fluid from the collector (10) to the space being heated.

3 Claims, 5 Drawing Figures

SOLAR COLLECTOR

TECHNICAL FIELD

The present invention relates to collectors for solar energy in general, and, in particular, to flat-plate collectors of solar energy which are tiltable so as to alter the angle at which solar energy is received by the collector to achieve maximum efficiency of energy collection.

DESCRIPTION OF THE PRIOR ART

It is generally known in the prior art that flat-plate solar collecting devices may be tilted relative to the horizon so as to orient the face of the collect in perpendicular relationship to the rays of the sun which impinge thereon. At least one example is known, that in U.S. Pat. No. 4,061,130, of a tiltable solar collector utilizing water as the heat transfer medium which includes passages conducting the water into the collector which extend into the lateral sides of the collector. It is also generally well known in the prior art to utilize tilting solar collectors operated by tracking devices to track the movement of the sun, and these devices are most commonly used with parabolic-type concentrating collectors, such as those shown in U.S. Pat. No. 4,114,594 and U.S. Pat. No. 4,149,523. U.S. Pat. No. 3,048,375 illustrates the general concept of a heat gain device utilizing louvers which may be pivoted relative to the horizontal. It is also well known in the prior art to construct flat-plate collectors which utilize air as a heat transfer medium. Examples of such collectors are shown in U.S. Pat. Nos. 4,090,493, 4,180,155, and 4,126,270.

SUMMARY OF THE INVENTION

The present invention is summarized in that a solar energy collector includes a collector frame having four sides and a back, two opposite lateral sides of the collector frame having air passage ports formed therein; at least one sheet of glazing extending between the four sides of the collector frame to cover the front thereof and to define a collector air passage between the glazing and the back of the collector frame; and first and second fixed, well-insulated air transfer passages extending into the air passage ports in the sides of the collector frame to open into the collector air passage, the air transfer passages being axially aligned along a horizontal axis and pivotally connected to the air passage ports such that the collector frame may be pivoted about the horizontal axis of the air transfer passages to vary the tilt of the solar collector without impeding air flow between the collector air passage and the air transfer passages.

It is an object of the present invention to provide a solar collector utilizing air as a heat transfer medium which is tiltable relative to the horizontal and which also has well-insulated, fixed, air transfer passages connecting the collector to the air space to be heated so that heat loss during the heat transfer to and from the collector is reduced to a minimum.

It is a further object of the present invention to provide such a solar collector in which the seal between the air transfer passages and the collector is tightened as the collector is pivoted toward a winter usage position.

It is a further object of the present invention to provide such a collector which may be also tilted about a vertical axis so that, if desired, the collector may track the movement of the sun during the day.

Other objects, advantages, and features of the present invention will become aparent from the following specification when taken in conjunction with the accompanying drawings.

DETAILED DESCRIPTION OF THE PREFERRED EMBODIMENT

Figure 1:
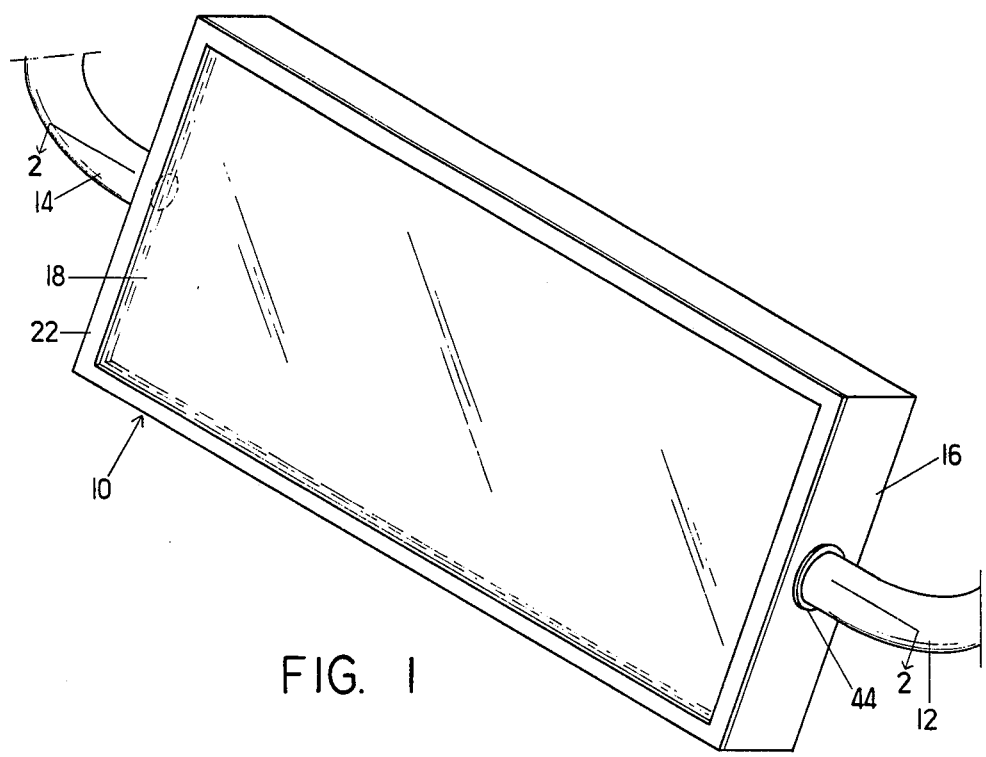
FIG. 1 is a perspective view of a solar energy collector constructed in accordance with the present invention.

Shown in FIG. 1 is a solar energy collector, generally indicated at 10, constructed in accordance with the present invention. The solar collector 10 is attached to a pair of axially aligned, fixed, well-insulated air transfer passages 12 and 14 connected to opposite lateral sides of the collector 10. The collector 10 itself is formed from a collector frame 16 having four sides and a back, with its front covered by at least one sheet of transparent glazing 18 as can be seen in FIG. 1.

Figure 2:
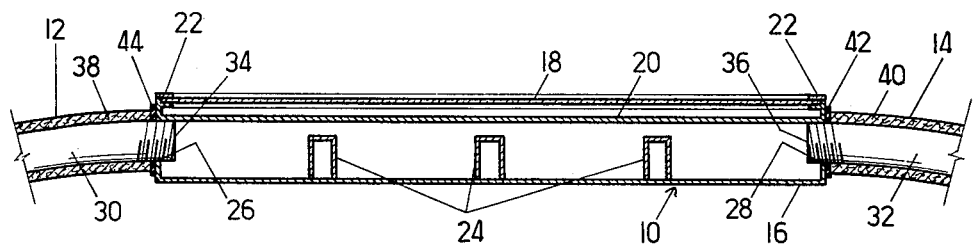
FIG. 2 is a cross-sectional view taken along the line 2—2 of FIG. 1.

Viewing the details of the collector 10, as shown in FIG. 2, it may be seen that the collector frame 16 is a generally rectangular box-shaped frame having four sides, a back, and an open front into which the external sheet of glazing 18 is mounted. A mounting strip 22 is provided to secure the sheet of glazing 18 in place against a peripheral flange provided on the interior of the collector frame 16. A second sheet of glazing 20 is provided spaced inwardly from and behind the exterior sheet of glazing 18. A collector air passage is defined between the second sheet of glazing 20 and the back of the collector frame 16 through which air is circulated so that it may be heated by the solar radiation captured by the collector 10. A series of baffles 24 are provided attached to the collector frame 16 and extending upward therein toward the interior sheet of glazing 20 in order to direct the air in a serpentine pathway through the collector air passage in the collector 10. In the center of each of the lateral sides of the collector frame 16 of the collector 10 is formed one of a pair of aligned air passage ports 26 and 28. The air passage ports 26 and 28 are each formed as circular threaded openings through the exterior wall of the side of the collector frame 16 opening into the collector air passage on the interior of the collector 10. The threads of the threaded openings of the air passage ports 26 and 28 are oppositely oriented with respect to each other as will be discussed in greater detail below.

Each of the fixed air transfer passages 12 and 14 includes therein a respective one of hot air pipes 30 and 32 which are axially aligned along a horizontal axis. Each of the hot air pipes 30 and 32 is provided at its forwardmost end extending into the collector frame 16 with a respective threaded portion 34 and 36. The threaded portions 34 and 36 are oppositely threaded in respect to each other so as to correspond to the threads formed in the threaded holes 26 and 28 in the collector frame 16. The threaded portion 34 at the end of the hot air pipe 30 and the threaded hole of the air passage port 26 in the collector frame 16 are provided with a left-hand thread and the threaded portion 36 of the hot air pipe 32 and the threaded hole of the air passage port 28 are provided with a right-hand thread for reasons as will be discussed below. A jacket of tightly wrapped or foamed insulation 38 and 40 is provided around the exterior of each of the hot air pipes 30 and 32. The insulation 38 and 40 may be any conventional type of insulation suitable for wrapping or foaming around a pipe and extends from a point just outside of the collector frame 16 to the point at which the hot air pipes 30 and 32 are connected to other units of a solar energy system, such as a storage device or an air duct inside the structure being heated. An annular gasket 42 and 44 of flexible compressible insulating material is provided on each of the hot air pipes 30 and 32 located between the insulation 38 and 40 and the exterior wall of the collector frame 16. The gaskets 42 and 44 are received around the threaded portions 34 and 36 of the hot air pipes 30 and 32 and are thick enough so that they are firmly sealed against both the insulation 38 and 40 and the collector frame 16.

In its operation, the solar energy collector of FIG. 1 functions to allow an air solar collector having fixed and well-insulated transfer passages to be tilted relative to the horizon so that the optimum angle of the solar collector may be selected for particular seasons of the year. This feature is advantageous inasmuch as the optimum angle for collecting solar energy varies as the sun varies in its peak height in the sky during the different seasons of the year and also varies during the course of any day. This tilting of the collector 10 may be accomplished by any suitable motorized means or may also be accomplished by a simple manual tilting of the collector with it being fixed in place at any desired angle to which it is adjusted. The collector 10 is tilted with the horizontal axis extending through the center of the two air transfer passages 10 and 12 being the pivotal axis of the tilt. In this manner, the collector 10 can be tilted without altering the connection of the well-insulated air transfer passages 12 and 14 to the collector and without interrupting the flow of air therethrough. Air may be introduced to the collector through either one of the air transfer passages 12 and 14 by way of the respective one of the air pipes 30 and 32 located therein, after which it passes through the collector 10 in the collector air passage therein and out through the other of the two transfer passages 12 and 14 to return to the space being heated or to suitable storage.

By providing for the fixed air transfer passages 12 and 14 and fixed hot air pipes 30 and 32, it is possible to provide a great deal of insulation 38 and 40 surrounding each of the hot air pipes 30 and 32. This is the significant advantage over prior art tiltable collectors inasmuch as no provision need be made for the air transfer passages 12 and 14 to move. By providing that the air transfer passages 12 and 14 enter the collector frame 16 at the axis about which the collector 10 pivots, the air transfer passages 12 and 14 do not move as the collector 10 is provided and may therefor be fixed. Inasmuch as the air transfer passages 12 and 14 do not move, great amounts of relatively inexpensive insulation may be provided at 38 and 40 to effectively insulate the hot air pipes 30 and 32 from the ambient outside air. This is often difficult in prior art tiltable collectors inasmuch as the air passages connecting the collector to the space being heated or to storage must normally be flexible and therefore difficult to insulate. The present invention avoid this difficulty. The provision for the gaskets 42 and 44 ensures that the sealing of the insulation 38 and 40 to the collector frame 16 of the collector 10 is made in at all times in an airtight manner. The gaskets 42 and 44 are preferably composed of compressable material so that they may be slightly compressed as the collector 10 is pivoted into its winter, or more vertical, position.

The threading of the threaded ends 34 and 36 of the hot air pipes 30 and 32 into the threaded holes of the air passage ports 26 and 28 in the sides of the collector frame 16 ensures a firm but pivotable connection between the hot air pipes 30 and 32 and the collector 10. The opposite threading of these two connections ensures that the collector 10 cannot move laterally as it is tilted relative to the air transfer passages 12 and 14 and also ensures that an air-tight connection between the sides of the collector frame 16 and the hot air pipes 30 and 32 is maintained. The selection of the appropriate right and left hand threads for the threaded ends 34 and 36 and the threaded holes of the air passage ports 26 and 28 is arranged so that the hot air pipes 30 and 32 are pulled toward the collector frame 16 as the collector is tilted into its winter, or more vertical, position and so that the hot air pipes 30 and 32 are pressed slightly away from the collector frame 16 when the collector 10 pivoted to its summer, or less vertical, position. This configuration is preferred over an opposite arrangement since all the components of the collector and transfer passages as shown in FIGS. 1 and 2 would tend to shrink in the cold weather normally associated with winter and thus the air-tight sealing of the air transfer passages 12 and 14 to the collector 10 would be facilitated by these members being pressed even more tightly together in the cold weather. This tightening of the connection would also serve to even more tightly seal the gaskets 42 and 44 in position.

Figure 3:
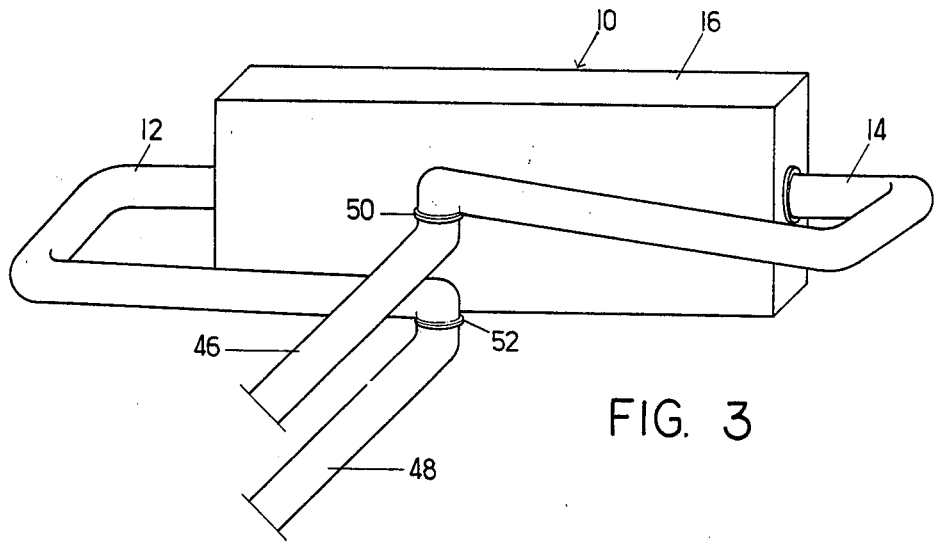
FIG. 3 is a rear perspective view of an air transfer passage arrangement which may be utilized with a solar collector constructed in accordance with the present invention.
Figure 4:
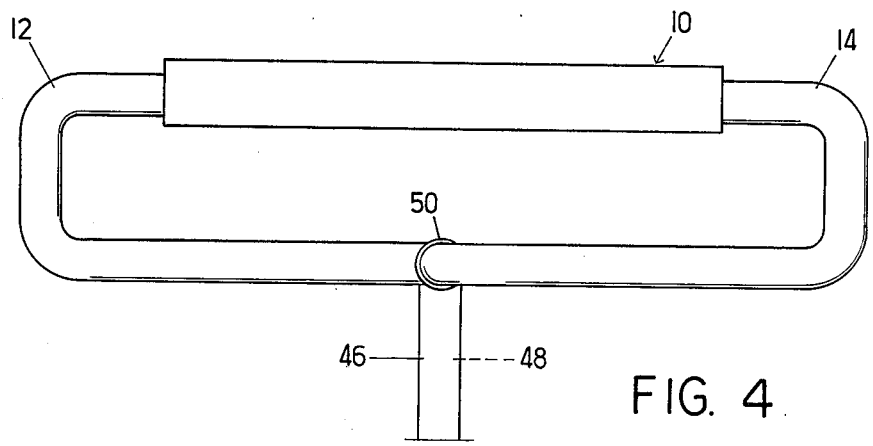
FIG. 4 is a top plan view of the air transfer passage arrangement of FIG. 3.
Figure 5:
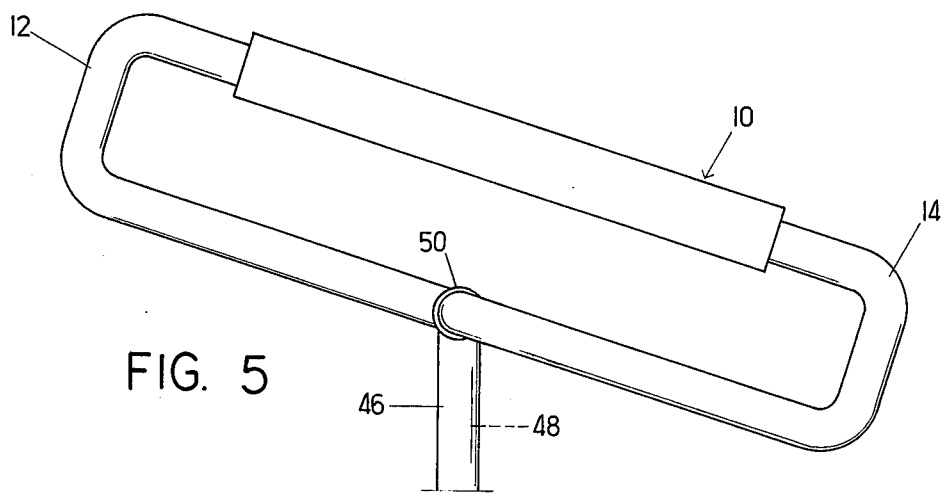
FIG. 5 is a top plan view, similar to FIG. 4, of the solar collector after the collector has been tilted about a vertical axis.

Shown in FIGS. 3-5 is an illustration of an arrangement of an air ducting system to collect to the solar collector 10 constructed in accordance with the present invention. As may be seen in FIG. 3, each of the fixed, insulated air transfer passages 12 and 14 extends outwardly from the collector 10 in a linearly fashion for a short distance after which each of the transfer passages 12 and 14 is bent at a right angle rearwardly. Both of the fixed air transfer passages 14 and 12 are then bent, again at a right angle, back toward each other until each is connected to a respective pivoting joint 50 and 52. The pivoting joints 50 and 52 connect the respective air transfer passages 14 and 12 to supplemental air transfer passages 46 and 48 which extend rearwardly from the pivoting joints 50 and 52 to connect to the remainder of the solar energy system utilized with the solar collector 10. As can be seen in FIGS. 3-5, the pivoting joints 50 and 52 and the supplemental air transfer passages 46 and 48 are arranged so that the pivoting joints 50 and 52 are positioned aligned in a vertical fashion one above the other rearwardly in the center of the collector 10. The supplemental air transfer passages 46 and 48 extend rearwardly from the pivoting joints 50 and 52 in a linear fashion one above the other until they are connected to the other components of the system.

The supplemental air ducting system in FIGS. 3-5 may be utilized where it is desired that the collector 10 be allowed to pivot about a vertical as well as a horizontal axis. Such pivoting about a vertical axis is necessary wherein it is desired that the solar collector track the sun across the sky during the court of the day as well as being tilted about the horizontal axis as may be desired to account for daily and seasonal variations in the sun's height in the sky. As can be seen in FIGS. 4 and 5, because the pivoting joints 50 and 52 are aligned one above the other in a linear vertical alignment, the collector 10 with the accompanying air transfer passages 12 and 14 is free to pivot about a vertical axis drawn through the center of the pivoting joints 50 and 52. The supplemental air transfer passages 46 and 48 remain stationary at all times. The collector 10 could also at any time be pivoted about the air transfer passages 12 and 14 about the horizontal axis extending therethrough with the air transfer passages 12 and 14 remaining fixed relative to that pivot. The pivoting joints 50 and 52 are constructed so as to be well-insulated pivotable connections joining the supplemental air passages 46 and 48 to the air transfer passages 12 and 14 in a weather tight fashion.

It is envisioned that the solar collector constructed in accordance with the present invention may be utilized in any air solar energy system in which it is desired that the collector pivot about a horizontal axis so as to vary the incidence of solar radiation thereto. It is further envisioned that this system may be utilized with any manner of reflectors or concentrators as may be desired for the particular application to concentrate or reflect solar energy onto the collector 10. It is understood that this solar collector 10' according to the present invention is particularly adapted for use with a solar energy collector utilizing air as the fluid transfer medium inasmuch as then the hot air pipes 30 and 32 may be connected through the sides of the collector to open into the interior collector air passage inside of the collector 10 without the need for any intermediate piping ducting or other structure.

It is understood that the present invention is not limited to the particular construction and arrangement of parts disclosed and illustrated herein, but embraces all such modified forms thereof as come within the scope of the following.

The embodiments of the invention in which an exclusive property or privilege is claimed are defined as follows:

1. A solar energy collector (10) comprising:
 a collector frame (16) having four sides and a back, two opposite lateral sides of the collector frame having air passage ports (26, 28) formed therein, each of the air passage ports formed as a threaded hole in the collector frame (16) with the direction of the threads of the two air passage ports (26, 28) being opposite;
 at least one sheet of glazing (18) extending between the four sides of the collector frame (16) to cover the front thereof and to define a collector air passage between the glazing (18) and the back of the collector frame; and
 first and second fixed, well-insulated air transfer passages (12, 14) extending into the air passage ports (26, 28) in the sides of the collector frame (16) to open into the collector air passage, the air transfer passages (12, 14) being axially aligned along a horizontal axis, each of the air transfer passages (12, 14) including a hot air pipe (30, 32) having a threaded end (34, 36) thereon threaded into the threads in the air passage ports (26, 28) to pivotally connect the air transfer passages (12, 14) to the air passage ports (26, 28) such that the collector frame (16) may be pivoted about the horizontal axis of the air transfer passages (12, 14) to vary the tilt of the solar collector (10) without impeding air flow between the collector air passage and the air transfer passages (12, 14), the opposite threading of the air passage ports (26, 28) and the corresponding threaded ends (34, 36) of the hot air pipes (30, 32) causing the connection of the air transfer passages (12, 14) to the collector frame (16) to tighten as the collector is pivoted in the direction of tilt of winter solar collection so as to minimize heat loss and thus maximize efficiency during the winter months.

2. A solar energy collector (10) comprising:
 a collector frame (16) having four sides and a back, two opposite lateral sides of the collector frame having air passage ports (26, 28) formed therein, each of the air passage ports formed as a threaded hole in the collector frame (16);
 at least one sheet of glazing (18) extending between the four sides of the collector frame (16) to cover the front thereof and to define a collector air passage between the glazing (18) and the back of the collector frame;
 first and second fixed, well-insulated air transfer passages (12, 14) extending into the air passage ports (26, 28) in the sides of the collector frame (16) to open into the collector air passage, the air transfer passages (12, 14) being axially aligned along a horizontal axis and including hot air pipes (30, 32) having threaded ends (34, 36) thereon threaded into the air passage ports (26, 28) on the collector frame (16) to pivotally connect the air transfer passages (12, 14) to the air passage ports (26, 28) such that the collector frame (16) may be pivoted about the horizontal axis of the air transfer passages (12, 14) to vary the tilt of the solar collector (10) without impeding air flow between the collector air passage and the air transfer passages (12, 14); and
 an annular, compressible gasket (42, 44) provided around each of the hot air pipes (30, 32) just outside of the collector frame (16), the gaskets (42, 44) being tightly pressed between the insulation on the outside of the hot air pipes (30, 32) and the exterior of the collector frame (16).

3. A solar energy collector (10) comprising:
 a collector frame (16) having four sides and a back, two opposite lateral sides of the collector frame having air passage ports (26, 28) formed therein;
 at least one sheet of glazing (18) extending between the four sides of the collector frame (16) to cover the front thereof and to define a collector air passage between the glazing (18) and the back of the collector frame;
 first and second fixed, well-insulated air transer passages (12, 14) extending into the air passage ports (26, 28) in the sides of the collector frame (16) to open into the collector air passage, the air transfer passages (12, 14) being axially aligned along a horizontal axis and pivotally connected to the air passage ports (26, 28) such that the collector frame (16) may be pivoted about the horizontal axis of the air transfer passages (12, 14) to vary the tilt of the solar collector (10) without impeding air flow between the collector air passage and the air transfer passages (12, 14); and
 supplemental air transfer passages (46, 48) connected to the air transfer passages (12, 14) by pivoting joints (50, 52), with the pivoting joints (50, 52) being aligned along a vertical axis so that the collector (10) may be pivoted about that vertical axis.

* * * * *